(12) United States Patent
Pollack et al.

(10) Patent No.: US 9,021,694 B2
(45) Date of Patent: May 5, 2015

(54) METHOD OF MAKING AN HERMETICALLY-SEALED FEED-THROUGH DEVICE

(75) Inventors: Michael J. Pollack, Lansdale, PA (US); Branson J. Darnell, Harleysville, PA (US); Mary Ann Kessler, New Hope, PA (US); William J. Zoll, Hatfield, PA (US); Richard A. DiDomizio, Hatfield, PA (US)

(73) Assignee: Pollack Laboratories, Inc., Colmar, PA (US)

( * ) Notice: Subject to any disclaimer, the term of this patent is extended or adjusted under 35 U.S.C. 154(b) by 532 days.

(21) Appl. No.: 13/405,755

(22) Filed: Feb. 27, 2012

(65) Prior Publication Data

US 2012/0151759 A1 Jun. 21, 2012

Related U.S. Application Data

(63) Continuation of application No. 11/968,537, filed on Jan. 2, 2008, now Pat. No. 8,146,249.

(60) Provisional application No. 60/883,247, filed on Jan. 3, 2007.

(51) Int. Cl.
| | | |
|---|---|---|
| *H01R 43/20* | (2006.01) | |
| *H01R 4/70* | (2006.01) | |
| *H01M 2/06* | (2006.01) | |
| *H01M 2/22* | (2006.01) | |
| *H01M 2/30* | (2006.01) | |
| *H01R 13/405* | (2006.01) | |
| *H01R 43/24* | (2006.01) | |
| *G02B 6/42* | (2006.01) | |
| *H01M 10/052* | (2010.01) | |
| *H01R 13/52* | (2006.01) | |

(52) U.S. Cl.
CPC ............... *H01R 4/70* (2013.01); *G02B 6/4248* (2013.01); *H01M 2/06* (2013.01); *H01M 2/22* (2013.01); *H01M 2/30* (2013.01); *H01M 10/052* (2013.01); *H01R 13/405* (2013.01); *H01R 13/521* (2013.01); *H01R 43/20* (2013.01); *H01R 43/24* (2013.01); *Y02E 60/12* (2013.01)

(58) Field of Classification Search
CPC ............ H01R 4/70; H01M 2/06; H01M 2/22; H01M 2/30; H01M 10/042; H01M 13/405; H01M 13/521
USPC .................... 29/825, 841, 848, 842, 874, 876
See application file for complete search history.

(56) References Cited

U.S. PATENT DOCUMENTS

| | | |
|---|---|---|
| 2,434,475 A | 1/1948 | Sullivan |
| 2,738,693 A | 3/1956 | Logan |

(Continued)

*Primary Examiner* — Carl Arbes
(74) *Attorney, Agent, or Firm* — Howson & Howson LLP

(57) ABSTRACT

A method of making a hermetically-sealed feed-through device includes inserting an elongate conductor or conductors within a hollow portion or portions of a plastic insulator body and inserting the plastic insulator body within a hollow outer jacket to form an assembly. At least one of the conductor or conductors, insulator body, or jacket of the assembly has a plurality of circumferential grooves. Thereafter, the assembly is crimped and/or is swage-crimped at ambient temperature to cause the materials of the conductor or conductors, insulator body, and outer jacket to be displaced or extrude into the grooves thereby creating mechanical interlocks between the conductor or conductors, insulator body, and outer jacket. Additional methods and feed-through devices made by the methods are also disclosed.

1 Claim, 3 Drawing Sheets

(56) References Cited

U.S. PATENT DOCUMENTS

| | | |
|---|---|---|
| 4,210,381 A | 7/1980 | Borgstrom |
| 4,484,022 A | 11/1984 | Eilentropp |
| 4,982,055 A * | 1/1991 | Pollack et al. .............. 174/151 |
| 5,170,017 A * | 12/1992 | Stanevich et al. ......... 174/153 G |
| 5,253,321 A | 10/1993 | Long et al. |
| 5,422,438 A | 6/1995 | Lamome |
| 5,545,059 A | 8/1996 | Nelson |
| 5,878,851 A | 3/1999 | Carlson et al. |
| 6,351,593 B1 * | 2/2002 | Pollack et al. .............. 385/138 |
| 6,609,937 B2 | 8/2003 | Haas, II et al. |
| 6,786,774 B2 | 9/2004 | Haas, II et al. |
| 7,094,967 B2 * | 8/2006 | Evans et al. ............... 174/650 |
| 7,114,956 B2 * | 10/2006 | Kreitzer et al. ............. 439/63 |
| 8,053,107 B1 | 11/2011 | Skinlo |
| 2005/0118501 A1 | 6/2005 | Hashimoto et al. |
| 2005/0159041 A1 | 7/2005 | Holliday |
| 2005/0287434 A1 | 12/2005 | Kim et al. |

* cited by examiner

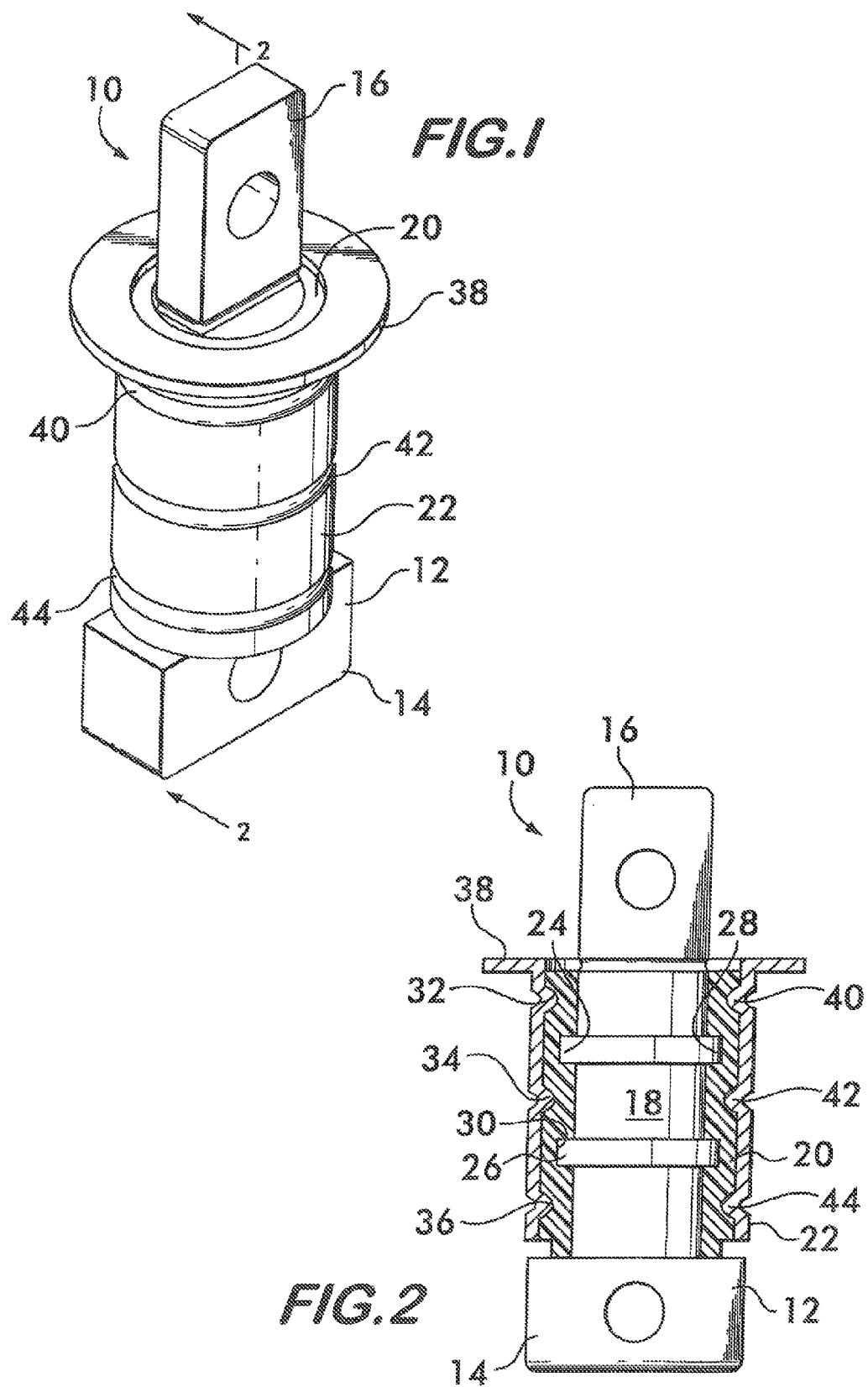

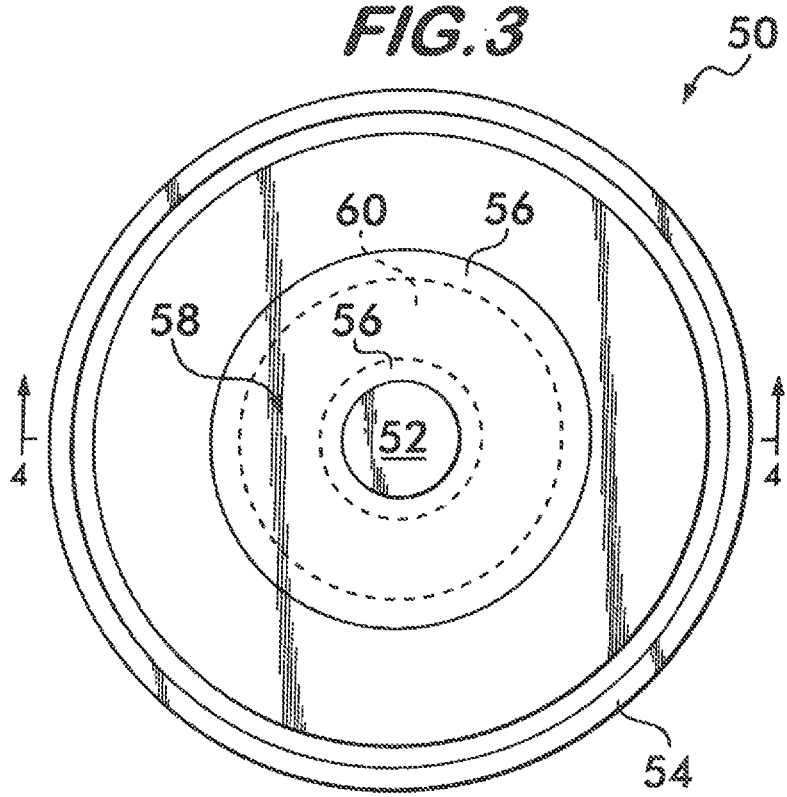
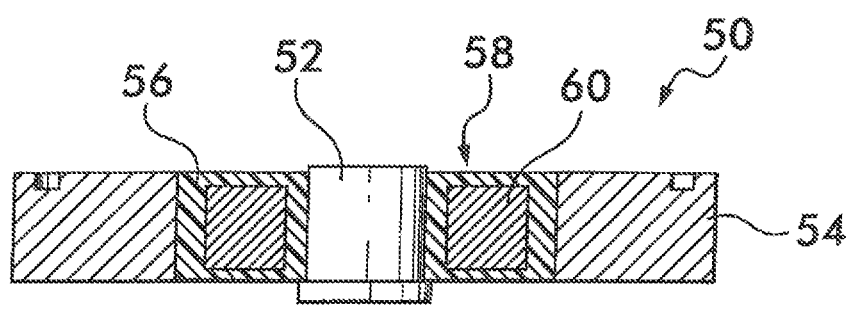

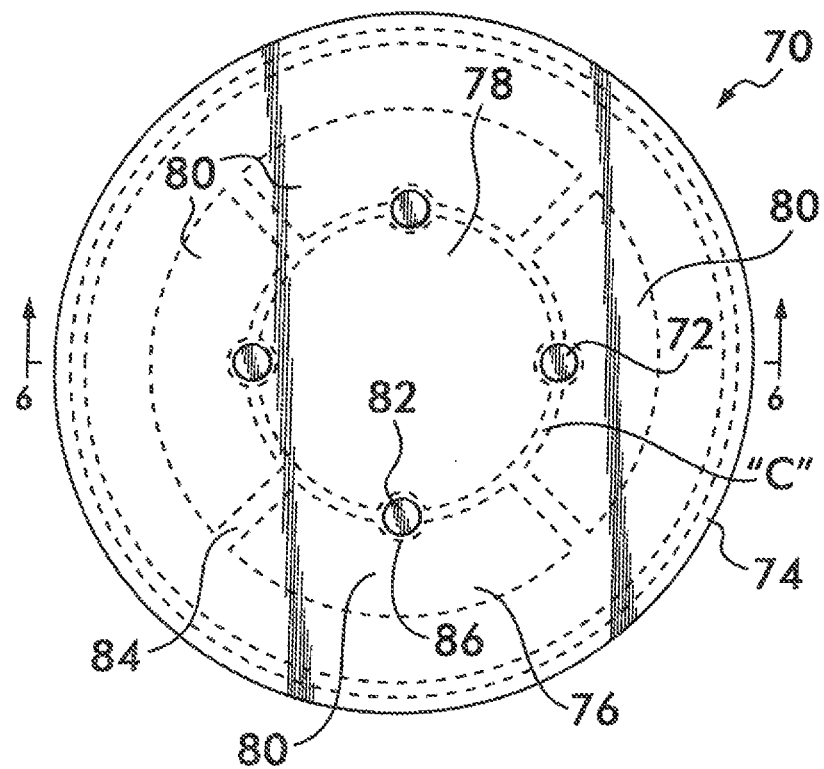
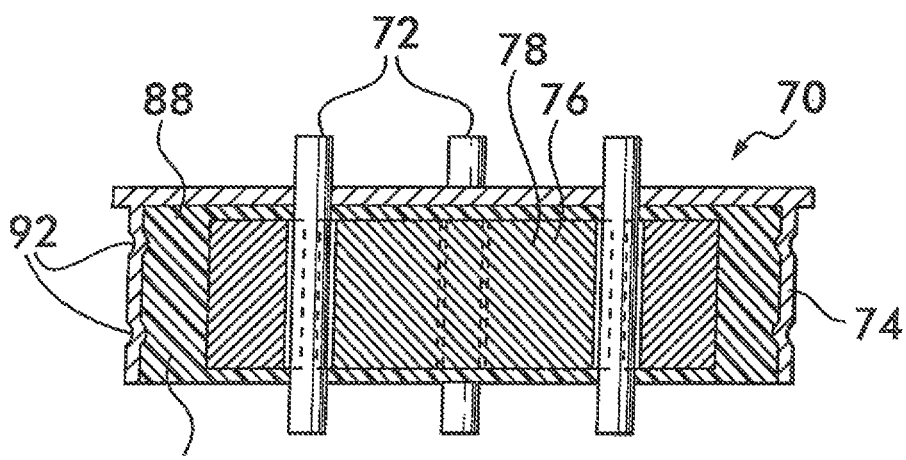

METHOD OF MAKING AN HERMETICALLY-SEALED FEED-THROUGH DEVICE

CROSS-REFERENCE TO RELATED APPLICATION

This application is a continuation of co-pending U.S. application Ser. No. 11/968,537, filed Jan. 2, 2008, which claims the benefit under 35 USC §119(c) of U.S. Provisional Patent Application No. 60/883,247, filed Jan. 3, 2007.

BACKGROUND

The present invention relates to feed-through devices subject to harsh environments, and more particularly, the present invention relates to a feed-through device, such as an electrical or optical feed-through device, that is hermetically sealed.

An electrical or optical feed-through device enables electrical or optical continuity from inside a sealed chamber or vessel through a wall of the chamber or vessel to a location external of the chamber or vessel. The feed-through device must be able to withstand the harsh environment within the chamber or vessel without permitting the creation of leakage paths out of, or into, the sealed chamber or vessel.

Examples of feed-through devices include: terminal feed-through devices for lithium batteries and other electrochemical devices having corrosive electrolytes; instrumentation electrical and RF feed-through devices for chemical reactor vessels; thermocouple feed-through devices for heat treating atmospheres and vacuum furnaces and environmental test chambers; and electrical power feed-through devices for controlled atmosphere furnaces and ovens. Also, see U.S. Pat. No. 4,982,055 issued to Pollack et al. which discloses a sealed electrical feed-through device, and U.S. Pat. No. 6,351,593 B1 issued to Pollack et al. which discloses a hermetically-sealed optical feed-through device.

Sealed electrical terminal feed-through devices typically utilize glass-to-metal, ceramic-to-metal, or molded plastic-to-metal seal technologies. The materials from which the terminal and insulator components of the devices are made are required to have substantially matching thermal coefficients of expansion over the end use operating temperature performance range of the devices to ensure that hermetic seals are maintained. Accordingly, this limits material choices and performance capabilities. In addition, the selection of the material used for the seal components is further limited due to the required fabrication process temperatures used during manufacture of the devices; because, the fabrication process temperatures are typically greater then the performance operating range of the devices.

Accordingly, there is a need for a feed-through device providing enhanced performance capabilities and a method for making a feed-through device that enables such extended capabilities to be achieved. The method of manufacturing the devices should permit the selection of materials for the terminal and insulator components from a wider variety of materials then currently permitted. The selected materials should provide the device with enhanced corrosion resistance capabilities and should reduce galvanic-induced corrosion and provide a longer lasting seal.

BRIEF SUMMARY

The present invention relates to a method of making a hermetically-sealed feed-through device. An elongate conductor is inserted within an insulator, and the insulator is inserted within a hollow outer jacket to form an assembly. As an alternative, multiple separate conductors can be inserted at spaced locations within the insulator. At least one of the conductor, insulator, or jacket of the assembly has a plurality of circumferential grooves. Thereafter, the assembly is crimped, swage-crimped, or both at ambient temperature to cause the materials of the conductor, insulator, and outer jacket to be displaced or extrude into the grooves thereby creating mechanical interlocks between the conductor, insulator, and outer jacket.

The operation of crimping, swage-crimping, or both, of the present invention includes a first crimping and/or swage-crimping operation in which two or more circumferentially-extending crimps are simultaneously formed at opposite end sections of the assembly and a separate second crimping and/or swage-crimping operation in which at least one circumferentially-extending crimp is formed at a location on the assembly spaced from and between the circumferentially-extending crimps formed at opposite end sections of the assembly.

According to a preferred embodiment of the present invention, the insulator is initially made or provided with at least a pair of spaced circumferential grooves on its inner surface for facing the conductor and at least three spaced-apart circumferential grooves on its outer surface for facing the outer jacket. Accordingly, during the crimping and/or swage-crimping operations, the circumferentially-extending crimps formed during the first operation are formed at locations corresponding to the outer pre-existing grooves on the outer surface of the insulator, and the crimp formed by the second operation is formed at a location corresponding to a middle one of the pre-existing grooves on the outer surface of the insulator.

Additional process steps according to the present invention can include annealing the outer jacket before the step of inserting the insulator within the hollow outer jacket, and annealing the crimped and/or swage-crimped assembly to a temperature below the melting point temperature of the insulator.

According to another aspect of the present invention, a method of making a hermetically-sealed electrical feed-through device includes positioning one or more separate conductors within a separate outer body in a mold such that a gap or gaps are formed between the single conductor or multiple spaced-apart conductors and the outer body. Thereafter, one or more inserts are inserted in the gap or gaps between the conductor or conductors and the outer body, and the gap or gaps are filled with molten material, such as plastic, such that the plastic encases the insert or inserts within the plastic. When permitted to harden, the plastic connects the conductors and inserts to the outer body. As an example, the inserts may be made of a ceramic material, a high temperature plastic material, or the like. In some cases, crimping and/or swage-crimping operations can be used to further secure the conductors, plastic insulator, and inserts to the outer body. In other cases, no crimping and/or swage-crimping operations may be required.

According to yet another aspect of the present invention, a hermetically-sealed electrical feed-through device is provided. The device has one or more elongate conductors each having a central section between opposite exposed ends and an insulator defining one or more hollow channels that confront and cover the central section of each of the conductors. An outer jacket confronts and covers the insulator, and at least a pair of spaced-apart outer circumferential crimps is formed in the outer jacket at locations adjacent opposite end sections of the insulator. In addition, at least one additional circumferential crimp is formed in the outer jacket at a location spaced from and between the outer circumferential crimps.

According to a preferred embodiment, the insulator has at least a pair of spaced circumferential grooves on its inner surface facing the conductor or conductors and at least three spaced-apart circumferential grooves on its outer surface facing the outer jacket. The locations of the outer circumferential crimps and the one additional circumferential crimp correspond to the grooves on the outer surface of the insulator, whereby the outer jacket deflects into the grooves on the outer surface of the insulator creating a hermetically-sealed, mechanical interlock therebetween of high mechanical strength. Extruded portions of the conductor or conductors extend into the grooves on the inner surface of the insulator thereby providing hermetically-sealed, mechanical interlocks of high mechanical strength between the conductor or conductors and the insulator sleeve.

According to yet another aspect of the present invention, a hermetically-sealed electrical feed-through device is provided that includes one or more conductors, a separate outer body, and a plastic insulator molded in place therebetween. The plastic insulator connects, separates, and suspends the conductor or conductors within the outer body. A separate insert or separate inserts can be embedded within the molded plastic insulator. As an example, the inserts may be made of ceramic or high-temperature plastic material.

BRIEF DESCRIPTION OF THE DRAWINGS

The foregoing features of the present invention should become apparent from the following description when taken in conjunction with the accompanying drawings, in which:

FIG. 1 is a perspective view of a first embodiment of an electrical feed-through device according to the present invention;

FIG. 2 is a cross-sectional view of the device of FIG. 1;

FIG. 3 is a plan view of a second electrical feed-through device according to the present invention;

FIG. 4 is a cross-sectional view of the device of FIG. 3; and

FIG. 5 is a plan view of a third electrical feed-through device according to the present invention; and FIG. 6 is a cross-sectional view of the device of FIG. 5.

DETAILED DESCRIPTION

A first embodiment of a feed-through device 10 according to the present invention is illustrated in FIGS. 1 and 2. As an example, the device 10 can be used as a terminal lead for the positive or negative electrode of a high voltage lithium-ion cell. Examples of other uses for the device 10 include: a terminal feed-through in other electrochemical devices; an instrumentation electrical and RF feed-through for chemical reactor vessels; a thermocouple feed-through for heat treating atmosphere and vacuum furnaces and environmental test chambers; and an electrical power feed-through for controlled atmosphere furnaces and ovens. Alternatively, the device can be an optical feed-through instead of an electrical feed-through.

The device 10 illustrated in FIGS. 1 and 2 has a center terminal conductor 12 with opposite exposed ends 14 and 16 to which welded and or mechanical connections can be formed on opposite sides of a wall of a chamber, vessel, or the like that separates a harsh environment from an adjacent environment. A center section 18 of the conductor 12 is encased within an insulator sleeve 20, and an outer body, covering, or jacket, 22 extends over the insulator sleeve 20 and sandwiches the insulator sleeve 20 between the conductor 12 and the outer body 22. The insulator sleeve 20 and outer body 22 provide a hermetic seal about the center section 18 of the conductor 12 to prevent liquids, gases, or other environmental contaminants from passing along the length of the conductor 12 between the engaging surfaces of the conductor 12 and insulator 20, as well as between the engaging surfaces of the insulator 20 and outer body 22.

As best illustrated in FIG. 2, the mating surfaces of the conductor 12, insulator 20, and outer body 22 are non-linear and substantially undulate with peaks and valleys between ends 14 and 16 of the conductor 12. These non-linear surfaces are formed by crimping and/or swage-crimping operations and function to further reduce the likelihood of leakage through the assembled device 10. As a result of the crimping and/or swage-crimping operations, the mating surfaces include a series of ridges and grooves tightly meshed together without void spaces. In the embodiment illustrated in FIGS. 1 and 2 for example, the center section 18 of the conductor 16 of the fully assembled device 10 is substantially cylindrical, except for a spaced pair of outwardly-extending circumferential ridges, 24 and 26; the insulator sleeve 20 is also substantially cylindrical, except for inner diameter circumferential grooves, 28 and 30, and outer diameter circumferential grooves, 32, 34 and 36; and the outer body 22 is also substantially cylindrical, except for an outwardly turned collar 38 at one end thereof and three inwardly-extending circumferential ridges, 40, 42 and 44.

This assembly is made by the following process. The conductor 12, insulator 20 and outer body 22 are produced separately from different materials that can have significantly different thermal coefficients of expansion. For example, the conductor 12 can be made of aluminum, copper, titanium, molybdenum, or the like, the insulator sleeve 20 can be molded of hard plastic, and the outer body 22 can be made of stainless steel or like material. Of course, other materials and combinations of materials can be selected for use.

In the embodiment illustrated in FIGS. 1 and 2, the center section 18 of the conductor 12, as originally manufactured, can be substantially cylindrical without ridges or grooves; and likewise, the outer body 22 is also originally formed without grooves or ridges. However, the insulator sleeve 20 can be molded with grooves 28, 30, 32, 24 and 36 substantially as illustrated in FIG. 2. Alternatively, the sleeve 20 can be molded without any ridges or grooves.

Preferably, before initial assembly of the components, the outer body 22 is annealed. As an example, the outer body 22 can be heated to a temperature of about 2000 to 2100° F. for a pre-determined period of time and then permitted to cool to ambient temperature. After this initial annealing, the conductor 12 is inserted into the hollow rigid plastic sleeve 20, and the sleeve 20 is inserted into the hollow annealed outer body 22. This places the assembly in condition for crimping operations, swage-crimping operations, or both, as discussed below.

Crimping and/or swage-crimping operations according to the present invention are accomplished at ambient temperature thereby permitting use of a wider range of materials for the various components of the device 10. The initial annealing step to the outer body component 22 effectively reduces the amount of compression forces required during the crimping and/or swage-crimping operations. The use of a reduced amount of force provides an advantage in that less of the softer materials, i.e., the center conductor 12 and plastic insulator sleeve 20, are extruded and displaced during the crimping and/or swage-crimping operations thereby enhancing the ability to form a tight hermetic seal of high mechanical strength between the various components.

The crimping and/or swage-crimping operations are accomplished in the following sequence. First, dual outer crimps are simultaneously formed adjacent the opposite ends of the insulator sleeve 20 via a first crimping and/or swage-crimping operation. The locations of these dual outer crimps correspond to the outer diameter grooves 32 and 36 of the sleeve 20. This causes the outer body 22 to deflect and extrude into grooves 32 and 34 thereby forming the inwardly directed ridges 40 and 44 of the outer body. During the dual outer crimping and/or swage-crimping operation, the material of the center conductor 12 extrudes into the inner diameter grooves, 28 and 30, of the insulator sleeve 20.

After the dual outer crimps are formed, a separate second crimping and/or swage-crimping operation is applied relative to the middle outer diameter groove 34 of the insulator sleeve 20. This creates the inwardly directed ridge 42 of the outer body 22 and further causes the center conductor 12 to extrude into the inner diameter grooves, 28 and 30, of the insulator sleeve 20. Thus, the grooves 28 and 30 are completely filled with the material of the conductor 12 and are without void spaces.

The purpose of the separate second crimping and/or swage-crimping operation is to further compress and displace the polymeric electrical insulator 20 and conductor 12 after the compressive boundaries have been formed by the initial dual outer crimping and/or swage-crimping operation. The second central crimping and/or swage-crimping operation increases the compressive load on the plastic insulator 20 and allows for larger mismatches in thermal expansion between the components of the device 10. The feed-through device 10 made by this process can undergo wider temperature excursions with no loss in hermeticity.

The dimensions of one or more ends of the device 10, such as the end 16, may be required to be within tight tolerances. For example, end 16 as illustrated includes a rectangular tip with opposite rectangular flat surfaces. Maintaining dimensional integrity of end 16 can pose a problem, since the soft materials of the conductor 12 and/or plastic sleeve 20 will extrude longitudinally out both ends during the crimping and/or swage-crimping operations. According to the present invention, dimensional integrity of end 16 is maintained by placing end 16 into a restraining cavity or mold during the crimping and/or swage-crimping operations to prevent extrusion of material from altering the desired, as-formed shape of end 16.

The grooves 28, 30, 32, 34 and 36 provide a reservoir for the movement of the softer components of the assembly during the crimping and/or swage-crimping operations. The softer more ductile material extrude into the grooves of the harder component materials thereby forming tight mechanical interlocks between the components of the assembly with no void spaces. The movement of the material into the grooves results in the formation of a longer and more arduous labyrinthine path between the confronting faces of the components of the device 10. In addition, the groove volumes minimize extrusion of the softer material to further ensure that outer dimensional stability of the feed-through device 10 is maintained.

As a final step, the crimped assembly is annealed and/or stress relieved by heating to a temperature below that of the melting point of the plastic insulator sleeve 20. For example, the complete assembly can be heated to a temperature of about or around 100° C. This temperature is selected based on the specifics of the plastic material and can be higher or lower than 100° C. This relieves the internal stresses in the plastic insulator material 20 developed during the crimping and/or swage-crimping operations and further enhances the hermeticity of the final assembly of the device 10.

A second embodiment of an electrical feed-through device is illustrated in FIGS. 3 and 4. Unlike the device 10 of FIGS. 1 and 2, the device 50 of FIGS. 3 and 4 has a relatively short length thereby eliminating the possibility of using the crimping and/or swage-crimping operations discussed above.

The device 50 includes a conductor 52 and an annular outer body 54. The conductor 52 can be centered within the outer body; however, it does not need to be centered and can be offset relative to the center of the outer body. As examples, the conductor 52 can be made of copper, aluminum, molybdenum, titanium or other material and the outer body 54 can be made of stainless steel or other materials. The conductor 52 and outer body 54 are positioned in a mold, and molten plastic 56 is filled in the gap 58 therebetween. Preferably, before the plastic 56 is added, a one-piece or multi-piece rigid insert 60, such as an annular insert, is position within the gap 58 such that it surrounds the conductor 52 and permits the molten plastic 56 to flow thereabout to thereby encapsulate the insert 60. See FIG. 4. As an example, the insert 60 can be made of a ceramic material, a high-temperature plastic material, or the like.

The insert 60 maximizes compressive forces during the cool down cycle of the plastic 56 and densifies the plastic insulator 56 so that higher levels of hermeticity can be achieved in insulator seals of thin cross sections. In addition, the rigid insert 60 increases the pressure capability of the feed-through device 50.

A third embodiment of an electrical feed-through device is illustrated in FIGS. 5 and 6. The device 70 includes a plurality of separate metal conductor pins 72 arranged within and extending through a hollow metal outer body 74. As best illustrated in FIG. 5, the illustrated embodiment includes four conductor pins 72 arranged at twelve o'clock, three o'clock, six o'clock, and nine o'clock positions about the imaginary circle "C" (see FIG. 5). Of course, other arrangements of the conductor pins can be used. The conductor pins 72 can be made of copper, aluminum, molybdenum, titanium or other material and the outer body 74 can be made of stainless steel or other material.

A multi-piece, segmented, rigid insert 76 is also positioned within the outer body 74. The insert 76 can be made of a ceramic material, a high-temperature plastic material, or the like. The insert 76 of the illustrated embodiment includes a centered disc-shaped insert 78 and four outer arcuate-shaped inserts 80. The disc-shaped insert 78 includes four longitudinally extending grooves 82 through which the conductor pins 72 are located and extend. The arcuate segments 80 are positioned about the center insert 78 and pins 72 with spacing 84 located between each adjacent pair of segments 80. In addition, each of the arcuate segments includes a longitudinally extending groove 86 through which one of the conductor pins 72 is located and extends. Thus, each conductor pin 72 is sandwiched within the outer body 74 between the center insert 78 and one of the arcuate segments 80.

The conductor pins 72, insert 76, and outer body 74 are positioned in a mold, and gaps 88 are present between the conductor pins 72, segmented insert 76 and outer body 74. Molten plastic 90 is filled into the gaps 88 and hardened to encapsulate the conductor pins 72 and insert 76 within the outer body 74.

As an optional additional step, the assembly of the pins 72, inserts 76, plastic 90, and outer body 74 can be subjected to crimping and/or swage-crimping operations to produce crimps 92 further securing and hermetically sealing the plastic 90 to the outer body 74.

For reasons discussed above, the methods and devices of the present invention permit broader selection of materials from which the devices 10, 50 and 70 can be manufactured. The broader selection expands the corrosion resistance capabilities of electrical and RF feed-through devices in chemically corrosive environments. In addition, the broader selection eliminates the need to use dissimilar metals between the electrical leads and the terminal thereby minimizing galvanic induced material instability. Galvanic induced corrosion is a limiting factor of electrical feed-through devices where long-term seal integrity is desired.

The design flexibility provided by the present invention is of special importance for high voltage lithium-ion cells in that the terminal lead conductor for the positive electrodes are typically aluminum while copper is common electrical leads for the negative electrodes. When aluminum and copper terminal feed-through devices are used, direct welding can be effected between the respective lead materials. This presents an ideal electrochemical condition and is well suited for long life applications.

The electrical terminal feed-through seal concept of the present invention also adapts well to larger electrochemical capacity cells, especially when the electrical terminal must carry high current. Accordingly, the terminal conductors must be relatively large in diameter, typically greater than 0.25 inches in diameter. Thus, scalability to larger size is another advantage of the present invention.

Various alternative designs can be utilized. For example, additional grooves can be formed in the plastic insulator, or the grooves can be formed in the conductor or outer jacket of the device instead of the insulator, or no grooves can be provided initially. In addition, the cross-section of the conductor and device is not limited to circular and can be any shape including, for instance, oval, multi-sided, square, rectangular, diamond-shaped, hexagonal, octagonal, and the like. Further, the conductor can be replaced with an optical rod if an optical feed-through device is desired.

While preferred feed-through devices and methods of manufacturing such devices have been described in detail, various modifications, alterations, and changes may be made without departing from the spirit and scope of the present invention as defined in the appended claims.

The invention claimed is:

1. A method of making a hermetically-sealed electrical feed-through device, comprising the steps of:
   positioning at least one conductor made of aluminum, copper, molybdenum or titanium within a separate outer body made of stainless steel in a mold such that a gap is formed between the at least one conductor and the outer body, the at least one conductor including multiple, separate, spaced-apart conductor pins;
   positioning an insert made of a ceramic material or a high temperature plastic material in the gap between the at least one conductor and the outer body, the insert including a multi-piece, segmented insert;
   filling the gap with molten plastic such that the plastic encases the insert within the plastic;
   permitting the plastic to harden thereby connecting the at least one conductor to the outer body; and
   crimping and/or swage-crimping the outer body to the hardened plastic.

* * * * *